United States Patent
Bhatia et al.

(10) Patent No.: US 9,204,409 B2
(45) Date of Patent: Dec. 1, 2015

(54) METHOD AND APPARATUS FOR DEVICE SYNCHRONIZATION AND POWER CONSERVATION IN A WIRELESS COMMUNICATION SYSTEM

(75) Inventors: Ashutosh Bhatia, Bangalore (IN); Ranjeet Kumar Patro, Bangalore (IN); Thenmozhi Arunan, Bangalore (IN)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 381 days.

(21) Appl. No.: 13/580,653

(22) PCT Filed: Feb. 22, 2011

(86) PCT No.: PCT/KR2011/001156
§ 371 (c)(1),
(2), (4) Date: Nov. 6, 2012

(87) PCT Pub. No.: WO2011/102698
PCT Pub. Date: Aug. 25, 2011

(65) Prior Publication Data
US 2013/0058318 A1    Mar. 7, 2013

(30) Foreign Application Priority Data

Feb. 22, 2010 (IN) .............................. 455/CHE/2010

(51) Int. Cl.
*H04W 36/04* (2009.01)
*H04W 56/00* (2009.01)
(52) U.S. Cl.
CPC .................................. *H04W 56/003* (2013.01)

(58) Field of Classification Search
CPC ..................... H04W 72/0446; H04W 56/003
USPC ............................................... 370/377
See application file for complete search history.

(56) References Cited

U.S. PATENT DOCUMENTS 7,673,057 B1 *   3/2010   Yip et al. ..................... 709/229
8,159,932 B1 *   4/2012   Hart et al. ..................... 370/208
(Continued)

FOREIGN PATENT DOCUMENTS

KR    10-2001-0071268        7/2001

OTHER PUBLICATIONS

International Search Report dated Oct. 28, 2011 in connection with International Patent Application No. PCT/KR2011/001156.
(Continued)

*Primary Examiner* — Jay P Patel (57) ABSTRACT

The present invention provides a method and apparatus for device synchronization and power conservation in a wireless communication system. In one embodiment, a method of a communication device for device synchronization and conserving power includes determining one or more device parameters in a wireless communication system, where the one or more device parameters are indicative of one or more time slots and at least one additional guard slot required during data transaction. The method also includes forming a connection request including the one or more device parameters, and communicating the connection request to a controller in the wireless communication system. Moreover, the method includes receiving a connection assignment frame including a device allocation interval from the controller based on the one or more device parameters, wherein the device allocation interval includes the one or more time slots and the at least one additional guard slot allocated to the communication device for data transaction.

38 Claims, 3 Drawing Sheets

(56) References Cited

U.S. PATENT DOCUMENTS

| | | |
|---|---|---|
| 2002/0131379 A1 | 9/2002 | Lee et al. |
| 2003/0162518 A1* | 8/2003 | Baldwin et al. ............ 455/253.2 |
| 2004/0146299 A1* | 7/2004 | Clapp ............................ 398/49 |
| 2004/0208176 A1* | 10/2004 | Goderis et al. ................ 370/389 |
| 2005/0122231 A1* | 6/2005 | Varaiya et al. ........... 340/870.01 |
| 2006/0153147 A1* | 7/2006 | Chillariga et al. ............ 370/337 |
| 2007/0160060 A1 | 7/2007 | Dalmases et al. |
| 2008/0052548 A1* | 2/2008 | Olsen et al. .................. 713/310 |
| 2008/0112366 A1* | 5/2008 | Uchida et al. ................ 370/332 |
| 2008/0130543 A1* | 6/2008 | Singh et al. ................... 370/311 |
| 2008/0298329 A1* | 12/2008 | Mo et al. ....................... 370/338 |
| 2009/0022078 A1* | 1/2009 | Patterson et al. ............. 370/311 |
| 2010/0202354 A1* | 8/2010 | Ho ................................ 370/328 |
| 2011/0244870 A1* | 10/2011 | Lee ............................... 455/444 |

OTHER PUBLICATIONS

Written Opinion of International Searching Authority dated Oct. 28, 2011 in connection with International Patent Application No. PCT/KR2010/001156.

* cited by examiner

METHOD AND APPARATUS FOR DEVICE SYNCHRONIZATION AND POWER CONSERVATION IN A WIRELESS COMMUNICATION SYSTEM

CROSS-REFERENCE TO RELATED APPLICATION(S)

The present application claims priority under 35 U.S.C. §365 to International Patent Application No. PCT/KR2011/001156 filed Feb. 22, 2011, entitled "METHOD AND APPARATUS FOR DEVICE SYNCHRONIZATION AND POWER CONSERVATION IN A WIRELESS COMMUNICATION SYSTEM". International Patent Application No. PCT/KR2011/001156 claims priority under 35 U.S.C. §365 and/or 35 U.S.C. §119(a) to Indian Patent Application No. 455/CHE/2010 filed Feb. 22, 2010 and which are incorporated herein by reference into the present disclosure as if fully set forth herein.

TECHNICAL FIELD

The present invention relates to the field of wireless communication network, and more particularly relates to conserving power in a time division multiple access (TDMA) based wireless communication system.

BACKGROUND ART

A time division multiple access (TDMA) based system may be distributed and centralized in nature. Centralized TDMA system consists of a controller or central hub, and multiple devices wirelessly connected to the controller. The controller is an entity responsible for creation and management of a centralized TDMA based network. Typically, the controller divides available time into multiple slots and defines a fixed period (superframe) containing fixed number of slots. Each device is allocated one or more slots for its data transmission.

Device oscillators often have a slight random deviation from their normal frequency, called clock skew. When clock drifts occur, a communication device may transmit earlier or later than the specified slot allocated to it. This means that, there is a shift either to the right or to the left in the time domain depending on the difference in the rate of the clock drifts between any two devices. Due to clock skew, the communication devices may get de-synchronized during the course of time with the controller. In order to keep the devices synchronized with the controller, the controller periodically transmits a special frame called 'beacon frame'. The devices listen for the beacon to remain synchronized with the controller and transmit data in their allocated time slot. This allows the devices to duty cycle when they don't have any data to transmit or not expecting any data from the controller, thereby conserving power.

DISCLOSURE OF INVENTION

Technical Problem

The time required between two consecutive time slots to avoid collision due to the clock skew occurred after latest synchronization point is known as guard time or guard band. However, the size of the guard band depends upon frequency of synchronization (i.e., the number of times a device listens a beacon frame per unit of time) and is constant and equal for all the devices connected to the controller. The guard band size is typically computed based on a clock skew rating of the devices. The clock skew rating is a maximum possible skew as per device crystal clock specification which is different from actual relative skew of devices with the controller. The fixed guard band size may cause higher power consumption in devices (apart from its regular data transmission) as the devices has to listen frequently beacon frames to remain synchronized with the controller. This may be more significant especially when the network is very lightly loaded or when the devices have very low duty cycle applications as compared to synchronization requirement.

Solution to Problem

Accordingly, the present invention has been designed to solve at least the above-mentioned problems occurring in the prior art, and provides method and apparatus for device synchronization and power conservation in a wireless communication system.

In accordance with an aspect of the present invention, there is provided a method of a communication device for device synchronization and power conservation in a wireless communication system. The method include: determining one or more device parameters indicative of one or more time slots and at least one additional guard slot required for data transaction, forming a connection request including the one or more device parameters, communicating the connection request to a controller in the wireless communication system, and receiving a connection assignment frame including a device allocation interval from the controller based on the one or more device parameters, wherein the device allocation interval includes the one or more time slots and the at least one additional guard slot allocated to the communication device for data transaction.

In accordance with another aspect of the present invention, there is provided a communication device. A communication device include a processor; and memory coupled to the processor and configured to temporarily store instructions capable of determining one or more device parameters indicative of one or more time slots and at least one additional guard slot required during data transaction; forming a connection request including the one or more device parameters; communicating the connection request to a controller in a wireless communication system; and receiving a connection assignment frame including a device allocation interval from the controller based on the one or more device parameters, wherein the device allocation interval includes the one or more time slots and the at least one additional guard slot allocated for data transaction.

Advantageous Effects of Invention

The invention uses additional guard time in addition to standard guard time based on current network load condition and device power requirement to reduce the frequency of synchronization requirement of a device. This saves the power because of listing beacon frame less frequently than the standard guard time.

BEST MODE FOR CARRYING OUT THE INVENTION

The present invention provides a method and apparatus for device synchronization and power conservation in a wireless communication system. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
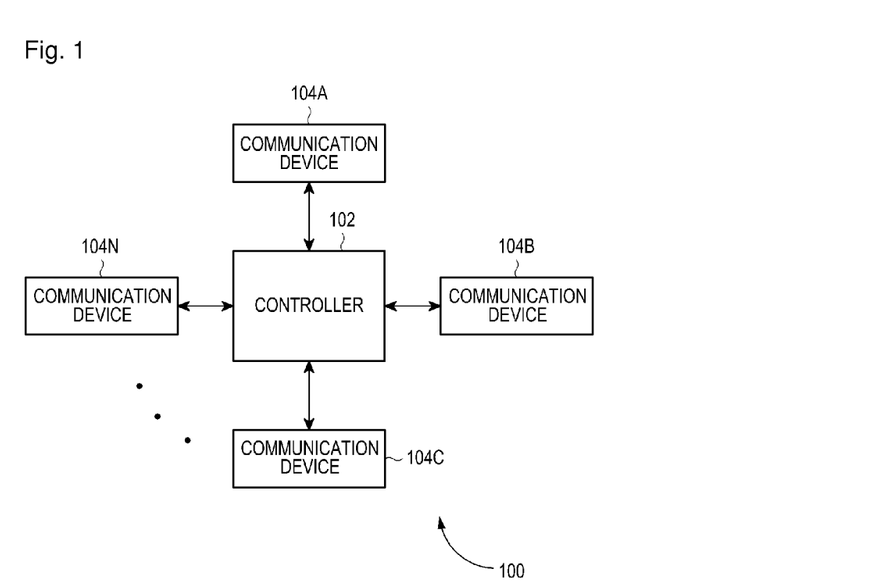
FIG. 1 illustrates a schematic diagram of a wireless communication system including a controller and communication devices, according to one embodiment.

FIG. 1 illustrates a schematic diagram of a wireless communication system 100 including a controller 102 and communication devices 104A-N, according to one embodiment. The wireless communication system 100 may be a slotted system of centralized type. In the centralized Slotted system, the controller 102 is connected to the communication devices 104A-N to manage access to a wireless channel between the communication devices 104A-N. The communication devices 104A-N may include body sensor devices, body implanted devices and battery powered devices. In one embodiment, the wireless communication system 100 implements a method of allocating time slots and assigning additional guard slots to reduce synchronization overhead and avoid collision of data as descried in greater detail in FIG. 2.

Figure 2:
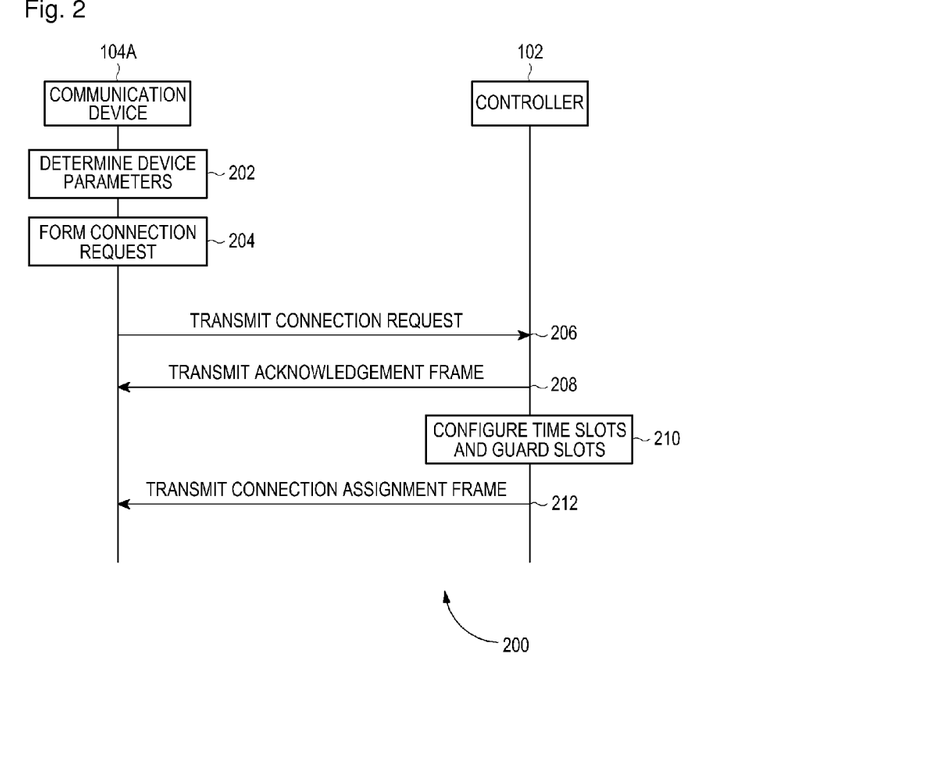
FIG. 2 illustrates a flow diagram of an exemplary method of allocating time slots and additional guard slots to a communication device of the wireless communication system, according to one embodiment.

FIG. 2 illustrates a flow diagram 200 of an exemplary method of allocating time slots and additional guard slots to the communication device 104A of the wireless communication system 100, according to one embodiment. At step 202, the communication device 104A determines device parameters indicating a number of time slots and additional guard slots required for data transaction. The device parameters may include actual clock skew of the communication device 104A with respect to the controller 102, minimum number of beacon frames to be skipped, a scale up factor and a scale down factor. The scale up factor and scale down factor indicate minimum and maximum values of slot with respect to the time slots. The scale up factor and scale down factor are calculated based on remaining battery power and packet arrival rate.

At step 204, the communication device 104A forms a connection request including the determined device parameters. At step 206, the communication device 104A communicates the connection request to the controller 104A. At step 208, the controller 102 transmits an acknowledgement frame to the communication device 104A in response to the connection request. At step 210, the controller 102 allocates the time slots and assigns additional guard slots in a MAC superframe to the communication device 104A based on the device parameters in the connection request. It can be noted that, the communication device 104A can only utilize the guard slot for synchronization reduction, whereas in case of the time slots, the communication device 104 can use full capacity of the time slots for data transaction. In one embodiment, the controller 102 determines whether there are any unallocated time slots equal or greater than equal to the time slots and additional slots in the MAC superframe. If so, the controller 102 allocates unallocated time slots to the communication device 104A. Otherwise, the controller 102 determines whether there are any time slots in the MAC superframe allocated to communication devices 104B-N. The controller 102 also determines whether one or more of the communication devices 104B-N include low priority devices.

Accordingly, the controller 102 unallocates the time slots allocated to the one or more of the communication devices 104B-N and allocates the unallocated time slots to the communication device 104A. The controller 102 may notify the one or more of the communication devices 104B-N regarding unallocation of the allocated time slots via a connection assignment frame. Further, the controller 102 reallocates any available time slots in the MAC superframe or different MAC superframe to the one or more of the communication devices 104B-N. If there are no time slots available in the MAC superframe, the controller 102 rejects the connection request from the communication device 104A.

At step 212, the controller 102 transmits a connection assignment frame or a multi-node connection assignment frame including a device allocation interval to the communication device 104A. The device allocation interval includes the time slots allocated and additional guard slots assigned to the communication device 104A. The additional guard slots are assigned by the controller 102 based on device parameters to reduce synchronization overhead due to frequent listening of beacon frames by the communication device 104A. The controller 102 may also transmit the connection assignment frame to the one or more of the communication device 104B-N to indicate re-allocation of time slots in the MAC superframe in a multi-node assignment frame.

In accordance to the above steps, the communication device 104A may skip listening of beacon frames transmitted during the connection establishment phase, thereby reducing synchronization overhead and conserving power. For this, the controller 102 periodically determines a maximum number of beacon frames that the communication device 104A can skip to listen during the connection establishment phase based on current network load. Then, the controller 102 communicates the above information to the communication device 104A via one of a beacon frame, acknowledgment frame, connection assignment frame, and any other message.

Figure 3:
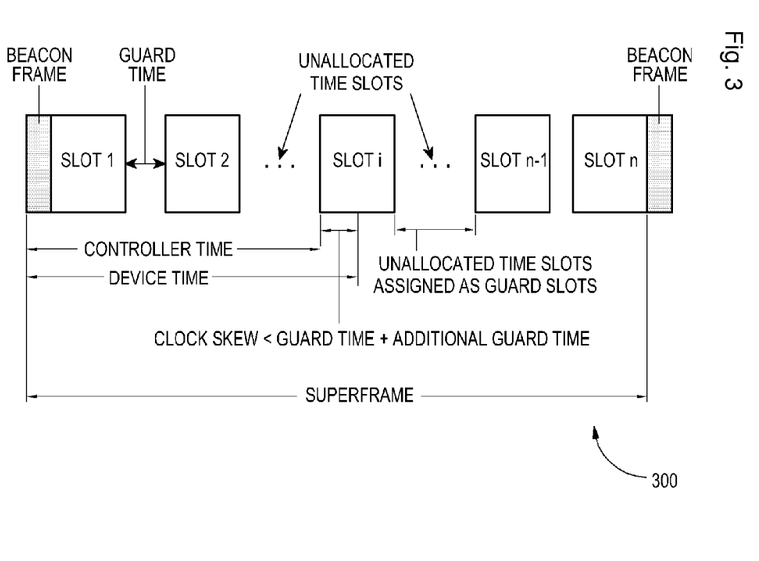
FIG. 3 illustrates a MAC superframe structure depicting allocation of time slots and guard slots to the communication device, according to one embodiment.

FIG. 3 illustrates a MAC superframe structure 300 depicting allocation of time slots and guard slots to the communication device, according to one embodiment. As illustrated in FIG. 3, free time slots are allocated as guard slots to reduce synchronization overhead of the communication device 104A. The guard slots are variable in size and are assigned based on the power saving requirement and actual clock skew of the communication device 104A. It can be seen from FIG. 3 that the clock slew of the communication device 104A is less than guard time assigned to the communication device 104 and hence the collision of data during data transmission is avoided.

Figure 4A:
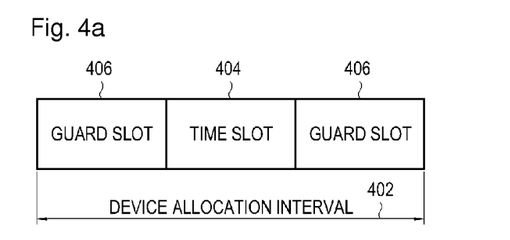
FIG. 4a is a schematic representation of a device allocation interval allocated to the communication device, according to one embodiment.

FIG. 4a is a schematic representation of a device allocation interval 402 allocated to the communication device 104A, according to one embodiment. In FIG. 4a, the device allocation interval 402 includes a single time guard slot 404 and a single additional guard slot 406 for data transaction.

Figure 4B:
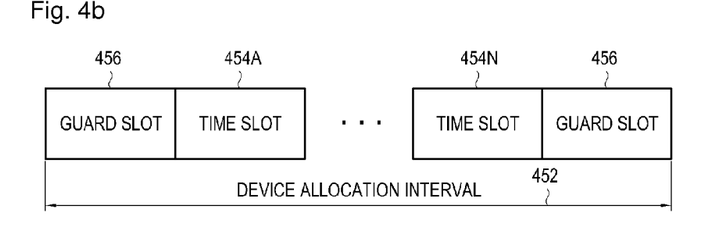
FIG. 4b is a schematic representation of a device allocation interval allocated to the communication device, according to another embodiment.

FIG. 4b is a schematic representation of a device allocation interval 452 allocated to the communication device 104A, according to another embodiment. In FIG. 4b, the device allocation interval 452 includes multiple time slots and additional guard slots configured for the communication device 104A by the controller 102 based on the device parameters.

Figure 5:
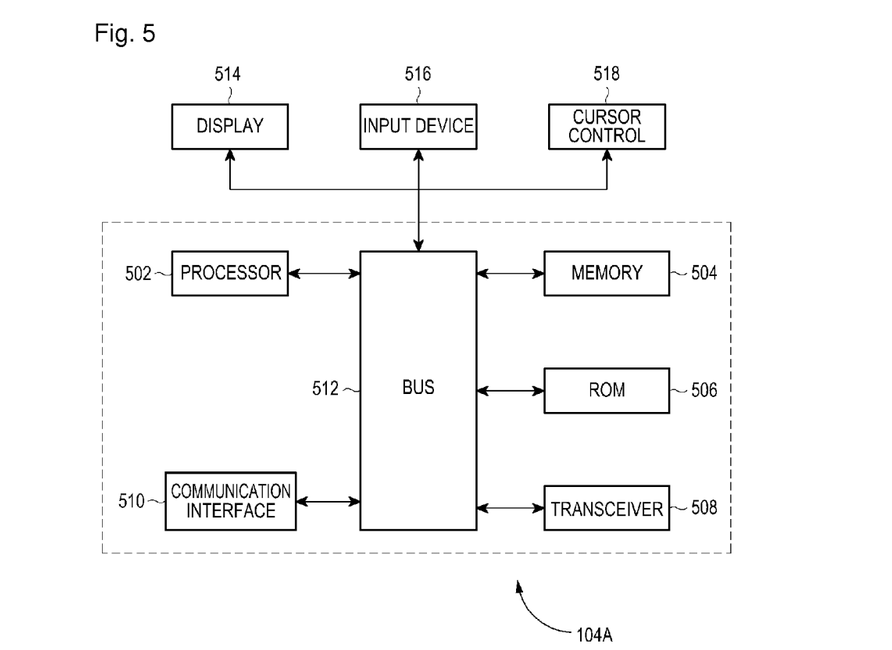
FIG. 5 illustrates a block diagram of the communication device showing various components for implementing embodiments of the present subject matter.

FIG. 5 illustrates a block diagram of the communication device 104A showing various components for implementing embodiments of the present subject matter. In FIG. 5, the communication device 104A includes a processor 502, memory 504, a read only memory (ROM) 506, a transceiver 508, a bus 510, a communication interface 512, and optionally a display 514, an input device 516, and a cursor control 518.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include embedded controllers, such as generic or programmable logic devices or arrays, application specific integrated circuits, single-chip computers, smart cards, and the like.

The memory 504 and the ROM 506 may be volatile memory and non-volatile memory. The memory 504 includes instructions temporarily stored therein to determine device parameters and send a connection request including the device parameters as illustrated one or more steps of FIG. 1. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 502. For example, a computer program may include machine-readable instructions capable of determining device parameters and sending a connection request including the device parameters according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the controller 102 to encode according to the various embodiments of the present subject matter.

The transceiver 508 may be capable of sending a connection request including device parameters to the controller 102 and receiving a connection assignment frame including a device allocation interval from the controller 102. The bus 510 acts as interconnect between various components of the communication device 104A. The components such as communication interfaces 512, the display 514, the input device 516, and the cursor control 518 are well known to the person skilled in the art and hence the explanation is thereof omitted.

Figure 6:
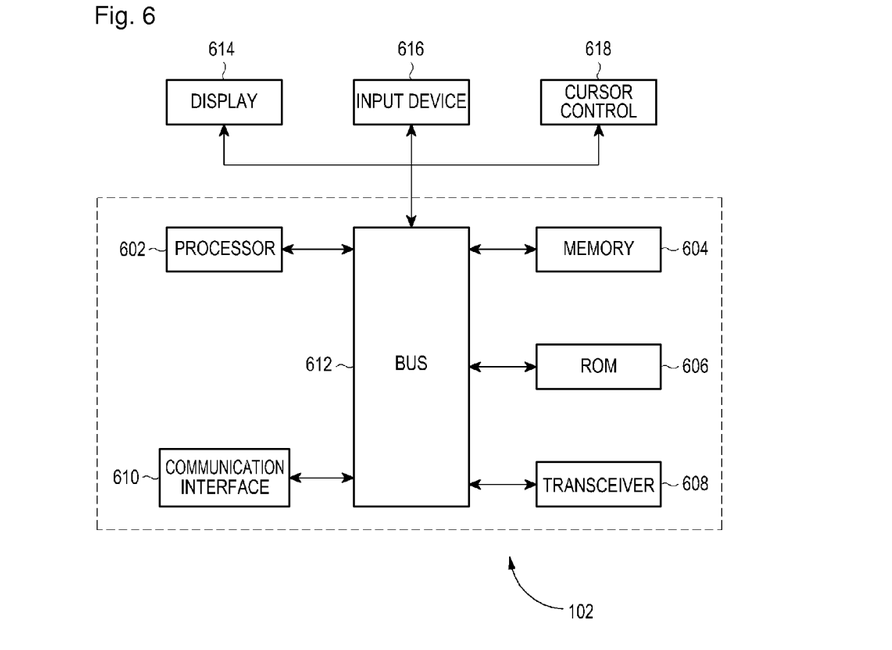
FIG. 6 is a block diagram of the controller showing various components for implementing embodiments of the present subject matter.

FIG. 6 is a block diagram of the controller 102 showing various components for implementing embodiments of the present subject matter. In FIG. 6, the controller 102 includes a processor 602, memory 604, a read only memory (ROM) 606, a transceiver 608, a bus 610, a communication interface 612, a display 614, an input device 616, and a cursor control 618.

The processor 602, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 602 may also include embedded controllers, such as generic or programmable logic devices or arrays, application specific integrated circuits, single-chip computers, smart cards, and the like.

The memory 604 and the ROM 606 may be volatile memory and non-volatile memory. The memory 604 includes instructions temporarily stored therein to allocate time slots for data transmission and assign guard slots for reducing synchronization overhead of the communication device 104A based on the connection request including device parameters as illustrated in various steps of FIG. 1. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 602. For example, a computer program may include machine-readable instructions capable of allocating time slots for data transmission and assigning guard slots for reducing synchronization overhead of the communication device 104A based on the connection request including device parameters according to the teachings and herein described embodiments of the present subject matter. In one embodiment, the program may be included on a compact disk-read only memory (CD-ROM) and loaded from the CD-ROM to a hard drive in the non-volatile memory. The machine-readable instructions may cause the controller 102 to encode according to the various embodiments of the present subject matter.

The transceiver 608 may be capable of receiving a connection request including device parameters from the communication device 104A and transmitting a connection assignment frame including a device allocation interval to the communication device 104A. The bus 610 acts as interconnect between various components of the controller 102. The components such as communication interfaces 612, the display 614, the input device 616, and the cursor control 618 are well known to the person skilled in the art and hence the explanation is thereof omitted. It is appreciated that, the present invention may be suitable for wireless local area networks and short range wireless networks, and more specifically to body area networks and sensor networks where devices are power constraint and long life time of devices is one of the major requirements.

The present embodiments have been described with reference to specific example embodiments, it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of operating a communication device for device synchronization and power conservation in a wireless communication, the method system comprising:
   generating a connection request including one or more device parameters indicative of the one or more time slots and at least one additional guard slot required for data transaction;
   communicating the connection request to a controller in the wireless communication system; and
   receiving a connection response indicating the one or more time slots and the at least one additional guard slot allocated to the communication device for data transaction based on the one or more device parameters,
   wherein at least one of the one or more device parameters is determined based on a remaining battery power of the communication device.

2. The method of claim 1, wherein the one or more device parameters are selected from the group consisting of a clock slew of the communication device with respect to the controller, minimum number of beacons frames to be skipped, a scale up factor, and a scale down factor.

3. The method of claim 2, wherein the scale up factor and the scale down factor are determined based on remaining battery power and packet arrival rate.

4. The method of claim 3, wherein the scale up factor and the scale down factor indicate minimum and maximum values of guard time with respect to the one or more time slots.

5. The method of claim 1, further comprising:
   skipping listening of a number of beacons frames to conserve power, wherein the number of beacon frames to be skipped are advertised by the controller in the connection response.

6. A non-transitory computer-readable storage medium having instructions stored therein, that when executed by a communication device, result in performing a method comprising:
   generating a connection request including one or more device parameters indicative of the one or more time slots and at least one additional guard slot required for data transaction;
   communicating the connection request to a controller in the wireless communication system; and
   receiving a connection response indicating the one or more time slots and the at least one additional guard slot allocated to the communication device for data transaction based on the one or more device parameters,
   wherein at least one of the one or more device parameters is determined based on a remaining battery power of the communication device.

7. The storage medium of claim 6, wherein the one or more device parameters are selected from the group consisting of a clock slew of the communication device with respect to the controller, minimum number of beacons frames to be skipped during a connection establishment phase, a power saving requirement, a scale up factor, and a scale down factor.

8. The storage medium of claim 7, wherein the scale up factor and the scale down factor are determined based on remaining battery power, packet arrival rate, and expected battery life time.

9. The storage medium of claim 8, wherein the scale up factor and the scale down factor indicate minimum and maximum values of guard time with respect to the one or more time slots.

10. The storage medium of claim 9, wherein the method further comprises:
    skipping listening of a number of beacons frames during a connection establishment phase to conserve power, wherein the number of beacon frames are advertised by the controller in the connection response.

11. A communication device comprising:
    a processor configured to generate a connection request including one or more device parameters indicative of the one or more time slots and at least one additional guard slot required for data transaction; and
    an interface unit configured to communicate the connection request to a controller in a wireless communication system and to receive a connection response indicating the one or more time slots and the at least one additional guard slot allocated for data transaction based on the one or more device parameters,
    wherein at least one of the one or more device parameters is determined based on a remaining battery power of the communication device.

12. The device of claim 11, wherein the one or more device parameters are selected from the group consisting of a clock slew of the communication device with respect to the controller, minimum number of beacons frames to be skipped during a connection establishment phase, a power saving requirement, a scale up factor, and a scale down factor.

13. The device of claim 12, wherein the scale up factor and the scale down factor are determined based on the remaining battery power, a packet arrival rate, and an expected battery life time.

14. The device of claim 13, wherein the scale up factor and the scale down factor indicate minimum and maximum values of guard time with respect to the one or more time slots.

15. The device of claim 11, wherein the processor is configured to skip listening of a number of beacons frames to conserve power, wherein the number of beacon frames are advertised by the controller in the connection response.

16. A method of a controller for allocating time slots in a medium access control (MAC) superframe to a communication device in a wireless communication system, the method comprising:
    receiving a connection request from the communication device for establishment of a connection with the controller, wherein the connection request includes device parameters indicative of number of time slots and additional guard slots required for data transaction;

configuring the number of time slots and the additional guard slots in a MAC superframe based on the device parameters in the connection request; and transmitting a connection response indicating the number of time slots and the additional guard slots allocated to the communication device based on the device parameters, wherein at least one of the one or more device parameters is determined based on a remaining battery power of the communication device.

17. The method of claim 16, wherein receiving the connection request from the communication device for establishment of the connection with the controller further comprises:

sending an acknowledgement frame to the communication device in response to the connection request.

18. The method of claim 16, wherein configuring the number of time slots and the additional guard slots in the MAC superframe based on the device parameters in the connection request comprises:

determining whether there are unallocated time slots equal to the number of time slots and the additional guard slots in the MAC superframe;

if so, allocating the unallocated time slots in the MAC superframe to the communication device;

if not, determining whether there are any time slots in the MAC superframe allocated to one or more communication devices, wherein the one or more communication devices are having a lower priority than the communication device;

if so, unallocating the allocated time slots from the MAC superframe and allocating the unallocated time slots to the communication device; and if not, rejecting the connection request received from the communication device.

19. The method of claim 18, wherein unallocating the allocated time slots from the MAC superframe and reallocating the unallocated time slots to the communication device comprises:

reallocating one or more unallocated time slots in the MAC superframe to the one or more communication devices; and transmitting a connection response indicating reallocation of the time slots in the MAC superframe to the one or more communication devices.

20. The method of claim 19, wherein the scale up factor and the scale down factor are determined based on the remaining battery power, a packet arrival rate, and an expected battery life time.

21. The method of claim 16, wherein the device parameters are selected from the group consisting of clock slew of the communication device with respect to the controller, minimum number of beacons frames to be skipped, power saving information, a scale up factor, and a scale down factor.

22. The method of claim 16, further comprising:

periodically determining a maximum number of beacon frames that the communication device can skip to listen based on a current network load; and advertising the maximum number of beacon frames allowed to skip to the communication device.

23. A non-transitory computer-readable storage medium having instructions stored therein for allocating time slots in a medium access control (MAC) superframe to a communication device in a wireless communication system, that when executed by a controller, result in performing a method comprising:

receiving a connection request from the communication device for establishment of a connection with the controller, wherein the connection request includes device parameters indicative of number of time slots and additional guard slots required for data transaction;

configuring the number of time slots and the additional guard slots in a MAC superframe based on the device parameters in the connection request; and transmitting a connection response indicating the number of time slots and the additional guard slots allocated to the communication device based on the device parameters, wherein at least one of the one or more device parameters is determined based on a remaining battery power of the communication device.

24. The storage medium of claim 23, wherein the instructions to receive the connection request from the communication device for establishment of the connection with the controller further comprises:

sending an acknowledgement frame to the communication device in response to the connection request.

25. The storage medium of claim 23, wherein the instructions to configure the number of time slots and the additional guard slots in the MAC superframe based on the device parameters in the connection request comprises:

determining whether there are unallocated time slots equal to the number of time slots and the additional guard slots in the MAC superframe;

if so, allocating the unallocated time slots in the MAC superframe to the communication device;

if not, determining whether there are any time slots in the MAC superframe allocated to one or more communication devices, wherein the one or more communication devices are having a lower priority than the communication device;

if so, unallocating the allocated time slots from the MAC superframe and allocating the unallocated time slots to the communication device; and if not, rejecting the connection request received from the communication device.

26. The storage medium of claim 25, wherein the instructions to unallocate the allocated time slots from the MAC superframe and reallocating the unallocated time slots to the communication device comprises:

reallocating one or more unallocated time slots in the MAC superframe to the one or more communication devices; and transmitting a connection response indicating reallocation of the time slots in the MAC superframe to the one or more communication devices.

27. The storage medium of claim 23, wherein the device parameters are selected from the group consisting of clock slew of the communication device with respect to the controller, minimum number of beacons frames to be skipped, power saving information, a scale up factor, and a scale down factor.

28. The storage medium of claim 27, wherein the scale up factor and the scale down factor are determined based on remaining battery power, packet arrival rate, and expected battery life time.

29. The storage medium of claim 23, wherein the method further comprises:

periodically determining a maximum number of beacon frames that the communication device can skip to listen based on a current network load; and advertising the maximum number of beacon frames allowed to skip during the connection establishment phase to the communication device.

30. A controller comprising:
an interface unit configured to receive a connection request from a communication device for establishment of a connection with the controller, wherein the connection request includes device parameters indicative of number of time slots and additional guard slots required for data transaction; and
a processor configured to configure the number of time slots and the additional guard slots in a MAC superframe based on the device parameters in the connection request,
wherein the interface unit is configured to transmit a connection response indicating the number of time slots and the additional guard slots allocated to the communication device based on the device parameters,
wherein at least one of the one or more device parameters is determined based on a remaining battery power of the communication device.

31. The controller of claim 30, wherein the interface unit is configured to send an acknowledgement frame to the communication device in response to the connection request.

32. The controller of claim 30, wherein the processor is configured to:
determine whether there are unallocated time slots equal to the number of time slots and the additional guard slots in the MAC superframe;
if so, allocate the unallocated time slots in the MAC superframe to the communication device;
if not, determine whether there are any time slots in the MAC superframe allocated to one or more communication devices, wherein the one or more communication devices are having a lower priority than the communication device;
if so, unallocate the allocated time slots from the MAC superframe and allocating the unallocated time slots to the communication device; and
if not, reject the connection request received from the communication device.

33. The controller of claim 32, wherein the processor is configured to reallocate one or more unallocated time slots in the MAC superframe to the one or more communication devices,
wherein the interface unit is configured to transmit a connection response indicating reallocation of the time slots in the MAC superframe to the one or more communication devices.

34. The controller of claim 30, wherein the device parameters are selected from the group consisting of clock slew of the communication device with respect to the controller, minimum number of beacons frames to be skipped, power saving information, a scale up factor, and a scale down factor.

35. The controller of claim 34, wherein the scale up factor and the scale down factor are determined based on the remaining battery power, a packet arrival rate, and an expected battery life time.

36. The controller of claim 30, wherein the processor is configured to periodically determine a maximum number of beacon frames that the communication device can skip to listen based on a current network load,
wherein the interface unit is configured to advertise the maximum number of beacon frames allowed to skip to the communication device.

37. A method of a communication device for device synchronization in a wireless communication, the method system comprising:
transmitting a connection request including one or more device parameters indicative of feature of the communication device to a controller in the wireless communication system; and
receiving a connection response indicating one or more time slots and at least one additional guard slot allocated to the communication device for data transaction based on the one or more device parameters,
wherein at least one of the one or more device parameters is determined based on a remaining battery power of the communication device.

38. The method of claim 37, wherein the feature of the communication device comprises remaining battery power of the communication device.

* * * * *